United States Patent [19]
Barnett et al.

[11] 4,261,056
[45] Apr. 7, 1981

[54] EQUALIZING SIGNAL COMBINER

[75] Inventors: William T. Barnett; Carl W. Lundgren, Jr., both of Colts Neck; William D. Rummler, Middletown; York Y. Wang, Ocean, all of N.J.

[73] Assignee: Bell Telephone Laboratories, Incorporated, Murray Hill, N.J.

[21] Appl. No.: 57,748

[22] Filed: Jul. 16, 1979

[51] Int. Cl.³ .............................................. H04B 7/04
[52] U.S. Cl. .................................. 455/273; 455/139; 455/276; 328/133
[58] Field of Search ................... 325/31, 56, 60, 67, 325/305, 306, 307, 366, 367, 368, 369, 387, 388, 476, 272, 273, 275, 276, 285, 289, 304; 328/133, 155; 455/52, 60, 67, 133, 137; 343/100 CL, 100 AD

[56] References Cited
U.S. PATENT DOCUMENTS

| | | | |
|---|---|---|---|
| 2,786,133 | 3/1957 | Dyke | 325/369 |
| 2,860,238 | 11/1958 | Dyke | 325/369 |
| 3,582,700 | 6/1971 | Curtis | 325/369 |
| 4,160,952 | 7/1979 | Seastrand, Jr. | 325/369 |

OTHER PUBLICATIONS

Measurements of the Effects of Propagation on Digital Radio System Equipped with Space Diversity and Adaptive Equalization, by Thomas Giuffrida, International Conference in Communication, Conference Record, vol. 3, Jun. 1979.

*Primary Examiner*—Howard W. Britton
*Assistant Examiner*—Tommy P. Chin
*Attorney, Agent, or Firm*—Sylvan Sherman

[57] ABSTRACT

A signal combiner in a digital radio system space diversity receiver measures (19) the power in selected portions of the spectrum of the output signal (18) and varies the circuit parameters (17) in a manner to maintain any preselected relationship among the measured powers. In a specific embodiment, means are provided for varying the relative phase $\phi$ of the local oscillator signals coupled to a pair of frequency converters in the signal paths 10, 11 as one means for maintaining a preselected relationship among the measured powers.

9 Claims, 8 Drawing Figures

EQUALIZING SIGNAL COMBINER

TECHNICAL FIELD

This invention relates to space diversity receivers and, in particular, to circuit arrangements for combining the two signals received in such systems.

BACKGROUND OF THE INVENTION

It is well known that radio waves, propagating from a transmitter to a receiver, can follow a plurality of different paths, and that the relative phase of the different waves arriving at the receiving antenna can be such as to destructively interfere, causing what is commonly referred to as a fade. In order to protect against this condition, the so-called "space diversity" system has been developed using two, spaced antennas to feed a diversity receiver which drives a common detector. The theory underlying the use of two spaced-apart antennas is that there is less likelihood that a fade will occur at both antennas at the same time. In the simplest system, means are provided to disconnect the receiver from one antenna as soon as the received signal level falls below a predetermined threshold and to connect the receiver to the second antenna. In this co-called "blind switching," it is assumed that the signal received by the second antenna is stronger than that received by the first antenna. In a more sophisticated system, the signals from the two antennas are combined at radio frequency or at an intermediate frequency instead of switching between the two. This eliminates amplitude and phase jumps associated with the switching operation, and has the added advantage of delivering a larger amplitude signal to the receiver.

In analogue radio systems, it is the practice to adjust the phases of the two received signals so as to maximize the total power in the combined signal. For example, in U.S. Pat. No. 2,786,133 the relative phase of the local oscillator signals coupled to a pair of frequency converters is adjusted such that the resulting IF signals produced combine to maximize the total signal.

Studies have shown, however, that the situation is more complex in a digital radio system. In particular, it has been found that the bit error rate (BER) in a digital system is more sensitive to the degree of inband amplitude dispersion and less sensitive to the magnitude of a flat fade. Accordingly, the Nippon Electric Company (NEC) includes in their Model RP-6G178MB, 78Mb/s, 6GHz, 8PSK system an equalizer following their maximum power signal combiner. The Collins Radio Division of Rockwell International provides in their Model MDR-6 radio system two separate, equalized receivers and switches between them at baseband as signal conditions require.

The broad objective of the present invention is to simplify space diversity receivers used in digital radio systems.

SUMMARY OF THE INVENTION

The present invention is based upon the discovery that the primary cause of message outages in a digital radio receiver is due to inband amplitude dispersion. Accordingly, a signal combiner in accordance with the invention trades off output power in favor of reduced amplitude dispersion by measuring the powers within selected portions of the output signal and varying the circuit parameters in a manner to maintain any preselected relationship among the measured powers. In an illustrative embodiment of the invention the signals are combined at IF and the relative amplitudes of selected frequency components in the combined signal are measured. In response to this measurement, a control signal is generated which changes the relative phase of the local oscillator signals coupled to the frequency downconverters in the receiver input circuits. As noted hereinabove, the control signal can be designed to establish and maintain any preselected relationship among the measured frequency components.

To preclude cancellation of the signal, the total power in the combined signal is also monitored, and the control signal biased to take onto account very deep fades.

It is an advantage of an equalizing combiner in accordance with the present invention that it significantly simplifies the construction of digital radio diversity receivers without sacrificing system performance.

DETAILED DESCRIPTION

Figure 1:
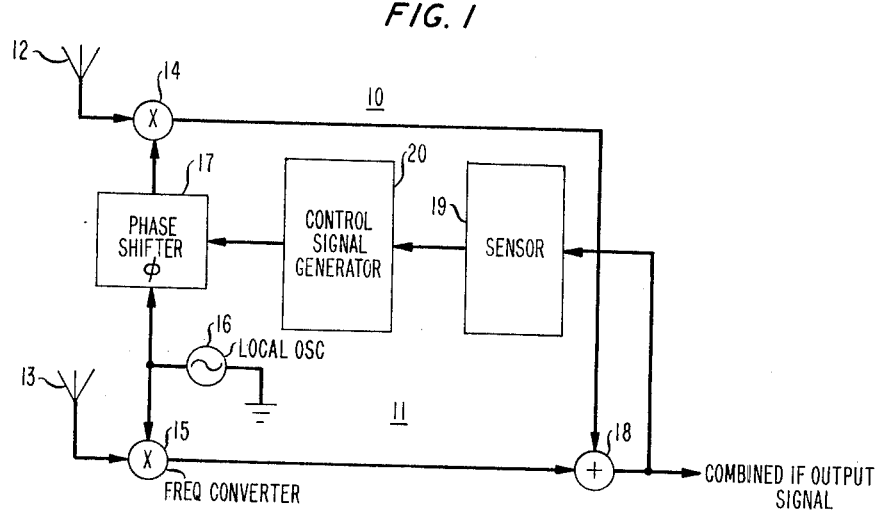
FIG. 1 shows, in block diagram, the elements of an equalizing combiner in accordance with the present invention.

Referring to the drawings, FIG. 1 shows, in block diagram, the elements of an equalizing combiner in accordance with the present invention. The combiner comprises a pair of signal circuits 10 and 11, each of which includes an antenna 12, 13 and a frequency converter 14, 15. A common local oscillator 16 provides local oscillator signals for the converters at a relative phase determined by a phase shifter 17 included between oscillator 16 and one of the converters 14. The resulting intermediate frequency signals, produced by the converters, are combined in a common output circuit by means of a coupler 18.

Unlike the prior art, which only monitors total power, a combiner in accordance with the present invention monitors the power in selected frequency components of the combined output signal in addition to the total output power. This is done in a sensor 19 connected to the output port of coupler 18. The results of these measurements are evaluated by a control signal generator 20, in accordance with whatever criteria have been preselected, and a control signal generated which varies the phase shift produced by phase shifter 17.

In operation, converters 14 and 15 down convert the inputs from the two spaced diversity antennas, adding a phase shift, $\phi$, to one of them. The resulting IF signals are then added vectorially in coupler 18 to produce an output signal whose envelope is given by $$v_c(t) = ae^{j\phi}v_1(t) + bv_2(t) \qquad (1)$$

where $v_1(t)$ and $v_2(t)$ are the envelopes of the input signals.

Sensor 19 monitors, at the combined output, the channel loss and the amplitude difference between components at two fixed frequencies within the band of interest. This information provides the data from which the control signal is generated. For purposes of illustration, let us define a control function $K(\phi)$ given by $$K(\phi) = (\text{amplitude difference})^\alpha = (\gamma \cdot \text{channel loss})^\beta \qquad (2)$$

where
the amplitude difference is in dB; the channel loss is in dB relative to an unfaded signal; and
$\alpha$, $\beta$ and $\gamma$ are constants.

For a particular digital radio system that was measured, either a 5.5 dB amplitude difference or a 45 dB flat fade caused a $10^{-3}$ BER. Similarly, a 2.2 dB difference or a 39 dB flat fade caused a $10^{-6}$ BER. Thus, choosing $\alpha = 2$, $\beta = 13$ and $\gamma = 0.027$ provides a control signal in which equal weight is given to varying amplitude differences and flat fades. By changing the values assigned to $\alpha$, $\beta$ and $\gamma$, other criteria can be established to satisfy different system requirements.

Figure 2:
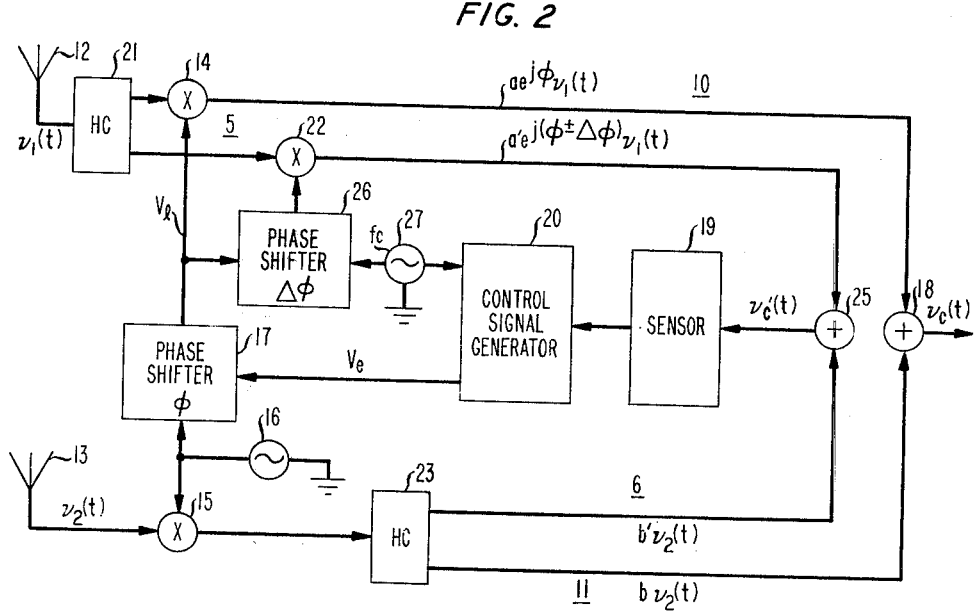
FIG. 2 shows a second embodiment of the invention.
Figure 3:
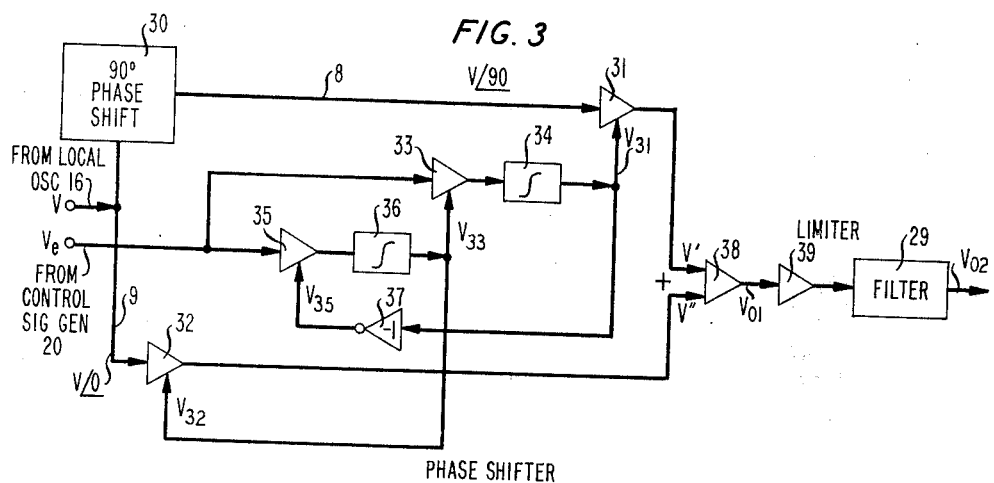
FIG. 3 shows an illustrative embodiment of a phase shifter.

FIG. 2, now to be considered, shows a second embodiment of an equalizing combiner in accordance with the invention. Identifying corresponding components with the same identification numerals used in FIG. 1, the combiner comprises a main signal circuit, including substantially the same components as in FIG. 1, and a substantially similar auxiliary circuit to which the sensor and control generator are connected. Thus, in FIG. 2 the main circuit comprises: a first wavepath 10 including a first antenna 12, a first hybrid coupler 21, and a first frequency converter 14; and a second wavepath 11 including a second antenna 13, a second frequency converter 15, and a second hybrid coupler 23. A local oscillator 16 is coupled to each converter by means including, in one path, phase shifter 17. The IF signals in wavepaths 10 and 11 are combined in a common output by main signal output coupler 18.

The auxiliary circuit includes a first auxiliary branch 5 connected to first coupler 21 for coupling a portion of the RF signal in wavepath 10 to a first auxiliary frequency converter 22. A second auxiliary branch 6 connected to second coupler 23 couples a component of the IF signal out of wavepath 11. The latter component and the output from converter 22 are added together by means of an auxiliary output coupler 25.

Frequency conversion in converter 22 is affected with a component of local oscillator signal from oscillator 16 which is coupled through phase shifter 17 and an auxiliary phase modulator 26. The phase shift, $\Delta\phi$, through the latter is slowly modulated at a frequency $f_c$, of the order of 1000 Hz, in response to a second local oscillator 27. The latter is also coupled to generator 20. The reason for this will become apparent hereinbelow.

The combined output signal from coupler 25 is coupled to sensor 19, wherein the appropriate signals are sampled. The sensor outputs are coupled, in turn, to control signal generator 20 wherein the appropriate control signal is generated for varying the phase shift through phase shifter 17.

Thus, the control signal is generated within an auxiliary combiner circuit that reflects, at any instant, the operating conditions that the main combiner circuit would have if its phase were offset by $\Delta\phi$. The advantage of this arrangement resides in that it avoids the need for introducing control signals in either diversity signal path.

The combined auxiliary signal $v_c'(t)$ at the output of coupler 25 may be expressed as $$v_c'(t) = a'e^{j(\phi + \Delta\phi)}v_1(t) + b'v_2(t). \qquad (3)$$

The auxiliary circuit is aligned by adjusting the coupler ratios such that $$b'/b = a'/a = r \qquad (4)$$

where
a and b are the coefficients of equation (1).
So proportioned, equation (3) becomes $$v_c'(t) = r[ae^{j(\phi + \Delta\phi)}v_1(t) + bv_2(t)] \qquad (5)$$

It will be noted that when $\Delta\phi = 0$, the output signal $v_c'(t)$ from the auxiliary circuit is, within a scale factor $r$, identical to the output signal $v_c(t)$ from the main signal combiner.

In operation, the control signal $K(\phi)$, given by equation (2), is developed from the auxiliary combiner output signal $v_c'(t)$ and, as noted, is a function of the average power within the channel and the power within two narrow portions of the channel centered about selected frequencies $f_1$ and $f_2$. Typically, these would be located near the 3 dB points of the spectrum of the received signal. Because of the phase modulations $\Delta\phi$, however, one obtains from these measurements, a control signal $K(\phi + \Delta\phi)$ which includes a component $K(\phi)$ and a component $K_1(\phi)\Delta\phi$ which indicates the direction in which $\phi$ should change in order to reduce the magnitude of $K(\phi)$. If, for example, $K(\phi + \Delta\phi)$ increases when $\Delta\phi$ increases, $\phi$ should be decreased. Conversely, if $K(\phi + \Delta\phi)$ decreases when $\Delta\phi$ increases, then $\phi$ should be increased. In any case, $\phi$ is caused to vary until $K(\phi)$ is minimized. It should be noted that the preferred condition established is not that of maximum output power but, rather a trade-off between reduced inband amplitude dispersion and power output.

Figure 4:
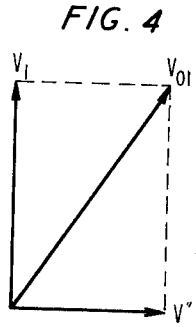
FIGS. 4, 5 and 6 are included for purposes of explaining the operation of the phase shifter of FIG. 3.
Figure 5:
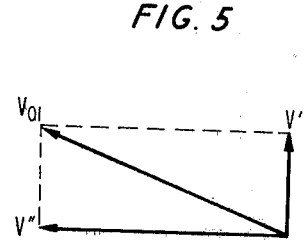

FIGS. 3, 4, 5, 6 and 7, included for purposes of explanation, show illustrative embodiments of a phase shifter, sensor, and a control signal generator for use with the present invention. As explained hereinabove, phase shifter 17, in response to a signal from the control generator, provides a continuously variable phase shift for the local oscillator signal coupled to frequency converter 14. In the illustrative embodiment of FIG. 3, a variable phase shift is obtained by varying the relative amplitudes and polarities of two orthogonal signal components. For example, the signal V from oscillator 16 is coupled by means of two wavepaths 8 and 9 to a summing amplifier 38. One wavepath 8 includes a variable gain amplifier 31 and a 90 degree phase shifter 30. The other wavepath 9 includes a second variable gain amplifier 32 that is substantially identical to amplifier 31. In operation, the local oscillator input signal, V, applied to the phase shifter produces output signals $V'$ and $V''$ at summing amplifier 38, as illustrated in FIG. 4. The phase of the output signal $V_{01}$ from amplifier 38, which is the vector sum of these two input signals, will depend upon their relative amplitudes and polarities. As illustrated in FIG. 4, output $V_{01}$ is in the first quadrant. If, on the other hand, the sense of signal $V''$ is reversed, as in FIG. 5, the phase of $V_{01}$ will increase to some value in the second quadrant.

Control of the amplitudes and polarities of signal components $V''$ and $V'$ is provided by the bias voltages $V_{31}$ and $V_{32}$ applied to amplifiers 31 and 32, respectively. The bias voltage circuits for generating these voltages include the variable gain amplifiers 33 and 35, integrating circuits 34 and 36, and inverter 37. A control signal $V_e$ from the control signal generator is coupled to each of the amplifiers 33 and 35. The resulting output signals are coupled, respectively, to integrators 34 and 36. The output $V_{31}$ from integrator 34 controls the gain of amplifier 31 and, in addition, is cross-coupled, through inverter 37, to amplifier 35 for controlling the gain of the latter. Similarly, the output from integrator 36 is coupled to amplifiers 32 and 33 for controlling their gains.

Figure 6:
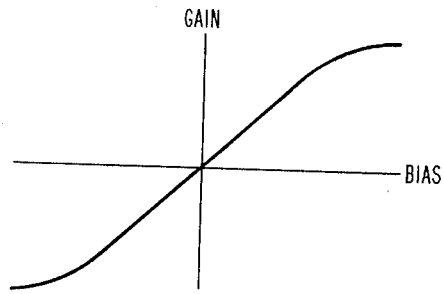

Each of the amplifiers 31, 32, 33 and 35 has a gain-bias characteristic of the type shown in FIG. 6. Thus, a positive bias signal produces an output signal having the same polarity as the input signal, whereas a negative bias voltage produces an output signal having the opposite polarity.

To illustrate the operation of the phase shifter, it is assumed that the phase shift $\phi_2$ is initially zero. For this to be the case, $V'$ is essentially zero and $V''=V$ within a scale factor. Thus, in the embodiment of FIG. 3, $V_{31}$ is initially zero (i.e., zero gain in amplifier 31), and $V_{32}$ is a positive voltage (i.e., positive gain through amplifier 32). If now, a control voltage $V_e$ is applied, the phase through the shifter will change and, in particular, the phase of the output voltage will rotate at an angular rate determined by the magnitude of the control voltage and by the slope of the gain-bias curves for the amplifiers 35 and 36. For example, if a positive control signal is applied, the initial response of amplifier 33 and integrator 34 is to cause the bias voltage $V_{31}$ to increase positively, producing a positive increase in the quadrature component $V'$. However, inverter 37 inverts this increasing positive signal to an increasing negative signal which is applied to amplifier 35. This results in a decrease in the output of integrator 36 which, when applied to amplifier 32, tends to reduce the amplitude of the zero phase signal component $V''$. As can be seen from the phasor diagrams of FIG. 4, an increasing $V'$ and a decreasing $V''$ has the effect of rotating their vector sum $V_{01}$ counter clockwise. If $V_e$ remains applied, the output from integrator 36 will, in time, become negative, causing first $V''$ to reverse phase and then $V'$ to reverse phase, thereby rotating the vector sum $V_{01}$ through the remaining three phase quadrants. In practice, however, the amplitude and sense of the control signal $V_e$ will vary as a function of the phase shift through phase shifter 17, and only limited phase shift corrections will be made to equalize the inband dispersion.

The limiter 39 and filter 29 are included merely to maintain a constant output signal and can alternatively be replaced by an amplifier with automatic gain control.

Figure 7:
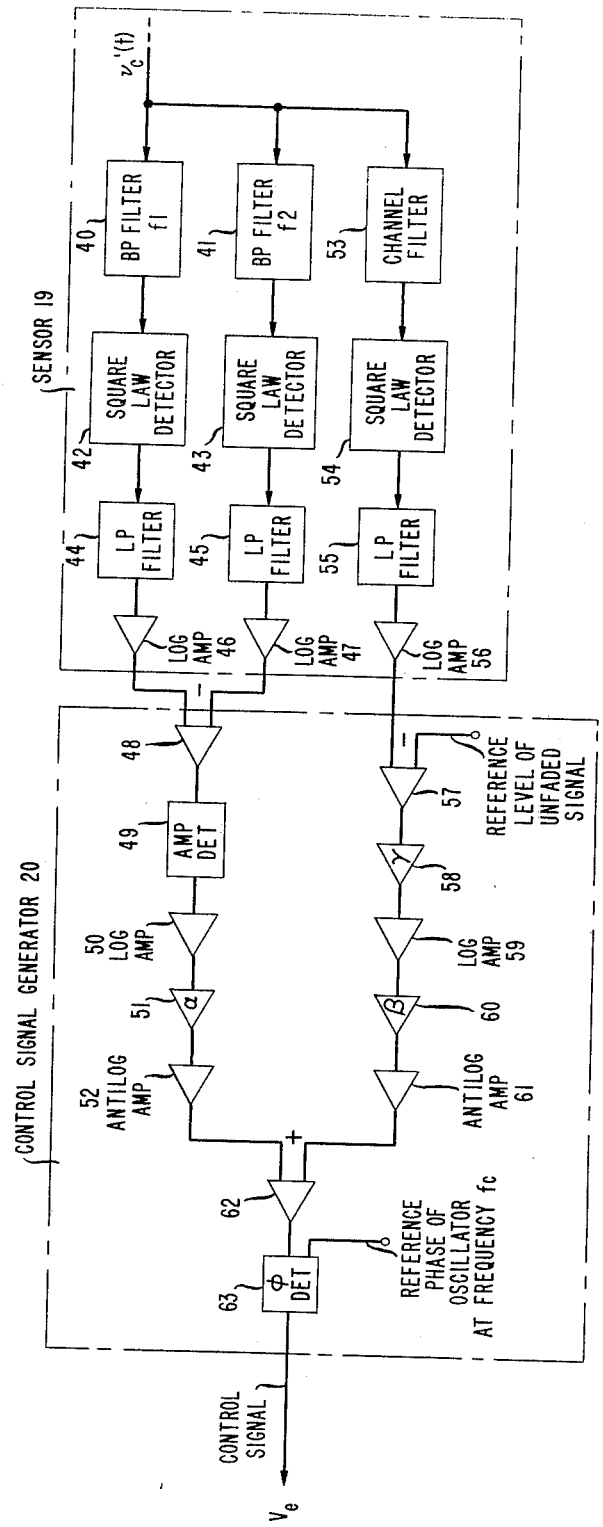
FIG. 7 shows an illustrative embodiment of a sensor and control signal generator.

FIG. 7, now to be considered, shows in block diagram an illustrative embodiment of sensor 19 and control signal generator 20. As indicated hereinabove, one object of the sensor is to measure the power difference in dB in two selected portions of the channel so as to obtain an indication of the inband amplitude dispersion. In the illustrative embodiment, the power in the band portion centered at $f_1$ is obtained by applying signal $v_c'(t)$ to a bandpass filter 40, detecting the output in a square law detector 42, and then filtering the detected signal in a lowpass filter 44. The resulting signal is converted to dB by log amplifier 46.

Similarly, the power in the hand portion centered at frequency $f_2$ is obtained by means of bandpass filter 41, square law detector 43, lowpass filter 45, and log amplifier 47.

To obtain a measure of the difference in the signal power within these two bands, the outputs from amplifiers 46 and 47 are coupled to difference amplifier 48 in the control signal generator 20. Inasmuch as it is only the amplitude of the difference signal that concerns us at this point, the output of amplifier 48 is coupled to an amplitude detector 49. The first weighted term, (amplitude difference)$^\alpha$, of equation (2) is then formed by log amplifier 50, amplifier 51 and antilog amplifier 52.

A second object of the sensor is to measure the total inband power. This is accomplished by channel filter 53, square law detector 54, lowpass filter 55, and log amplifier 56. This signal is then compared with a reference level signal in a difference amplifier 57 in the control signal generator, where the reference level signal is indicative of an unfaded signal. This measurement is weighted by means of amplifier 58, log amplifier 59, amplifier 60, and antilog amplifier 61 to form the second term, ($\gamma$·channel loss)$^\beta$, of equation (2).

The two terms are then combined in a summing amplifier 62 to form the signal $K(\phi+\Delta\phi)$. To obtain the sense of the control signal, the signal $K(\phi+\Delta\phi)$ is compared with the phase modulating signal from oscillator 27 in a phase detector 63.

While the control signal generator has been described using analog devices, it is apparent that the signals from the sensor can be digitized and the control signal generator implemented using digital techniques.

Figure 8:
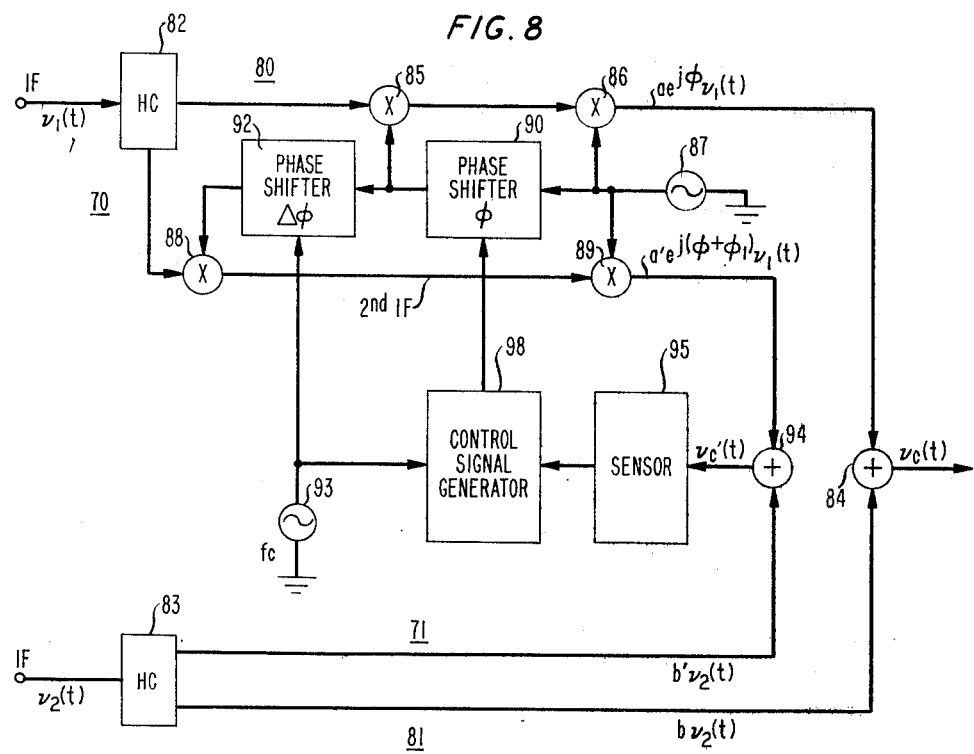
FIG. 8 shows an alternate embodiment of the invention.

FIG. 8 shows an alternate embodiment of the invention wherein the combiner operates on the signals after they have been converted to their IF freqency. In this embodiment, the main signal circuit includes wavepaths 80, 81 and output coupler 84. Wavepath 80 includes a first hybrid coupler 82, and first and second frequency converters 85 and 86. Wavepath 81 includes a second hybrid coupler 83.

The auxiliary circuit comprises branches 70 and 71. The first branch 70, connected between hybrid coupler 82 and auxiliary output coupler 94, includes first and second auxiliary frequency converters 88 and 89. The second auxiliary branch is connected between hybrid coupler 83 and output coupler 94.

A local oscillator 87 is connected directly to each of the converters 86 and 89, and to converters 85 and 88 through phase shifters 90 and 90 and 92, respectively.

A second local oscillator 93 is coupled to phase shifter 92 and to control signal generator 98. Also coupled to control signal generator 98 are the output signals from sensor 95 which senses the power in selected portions of the output signal from coupler 94.

In operation, the IF signal in wavepath 81 is coupled directly to output coupler 84. The IF signal in wavepath 80, on the other hand, undergoes a frequency conversion in converter 85 (either up or down) to a second IF frequency followed by another frequency conversion in converter 86 back to the original IF frequency. Because of the relative phase shift $\phi$ between the phases of the local oscillator signals coupled to converters 85 and 86, the resulting IF signal components in wavepath 80 experience an added phase shift relative to the signal in wavepath 81.

Similarly, the signal components in the first auxiliary branch, after the double conversion in converters 88 and 89, experience the same phase shift relative to the signal components in the second auxiliary branch, except that there is the added phase shift $\Delta\phi$ induced in phase shifter 92 by the second local oscillator 93. Thus, the output signal $v_c(t)$ from output coupler 84 and $v_c'(t)$ from auxiliary output coupler 94 are the same as those produced in the embodiment of FIG. 2 and, hence, equalization is achieved in the same manner as described hereinabove.

It will be recognized that the techniques for achieving signal equalization as described hereinabove are merely illustrative and that other means for doing so will be readily apparent to those skilled in the art. in particular, whereas the invention has been described in terms of controlling the relative phase of the two local oscillator signals coupled to a pair of frequency converters, any means of controlling the relative phase of the two diversity receiver signals can just as readily be used to obtain the desired equalization.

We claim:

1. For use in a space diversity receiver, an equalizing signal combiner comprising:
   first (10) and second (11) signal paths;
   means (18) for combining the signals on said paths;
   characterized in that said equalizing combiner further includes:
   means (19) for measuring the power in at least two selected portions of the frequency spectrum of said combined signal; and
   means (20), (17) for varying the parameters of said equalizing combiner in a manner to maintain any preselected relationship among the measured powers.

2. For use in a space diversity receiver, an equalizing combiner comprising:
   a first signal path (10), including a first frequency converter (14) coupled to a first antenna (12);
   a second signal path (11), including a second frequency converter (15) coupled to a second antenna (13);
   a local oscillator (16) coupled to both of said converters (14), (15); and
   means (17) for introducing a relative phase shift between the local oscilator signals coupled to said converters (14), (15);
   characterized in that said equalizing combiner further includes:
   means (19) for sensing the relative powers within selected portions of the spectrum of the combined output signal; and
   means (17), (20) for varying the relative phase of the local oscillator signals coupled to said converters (14), (15) so as to maintain a preselected relationship between the powers in said selected portions of the spectrum.

3. An equalizing combiner comprising:
   a main signal circuit including two wavepaths (10) and (11),
   a main circuit output couler (18) for combining the signals in said wavepaths;
   characterized in that said equalizing combiner further comprises:
   an auxiliary signal circuit including two auxiliary branches (5) and (6), each of which is coupled to one of said main circuit wavepaths (10) and (11);
   an auxiliary circuit output coupler (25) for combining the signals in said auxiliary branches (5), (6) to produce an auxiliary output signal; ;p2 means (19) for measuring the power in selected portions of the spectrum of said auxiliary output signal;

means (20) for generating a control signal whose amplitude is a function of said measured powers; and
   means (17), responsive to said control signal, for establishing and maintaining a preselected relationship between the measured powers in said spectrum portions.

4. The equalizing combiner according to claim 3 wherein:
   each of said main wavepaths (10), (11) includes a frequency converter (14), (15);
   a local oscillator (16) is coupled to each converter by means including a first phase shifter (17) connected between said oscillator and one of said converters (14);
   and wherein the phase shift through said phase shifter (17) varies in response to said control signal.

5. The equalizing combiner accordng to claim 4 wherein:
   said auxiliary branch (5) includes an auxiliary frequency converter (22);
   said local oscillator (16) is coupled to said converter (22) by means of said first phase shifter (17) and a second phase shifter (26);
   and wherein a second local oscillator (27) modulates the phase shift through said second phase shifter (26).

6. The equalizing combiner according to claim 3 wherein:
   said measuring means (19) also measures the total power within said auxiliary output signal;
   and wherein said control signal includes a component which is a function of the difference between said total power and a reference signal.

7. The equalizing combiner according to claim 5 wherein said control signal $K(\phi)$ is given by $$K(\phi) = (\text{amplitude difference})^\alpha + (\gamma \cdot \text{channel loss})^\beta$$

where
   amplitude difference is the difference in dB between the power measured in said portions of the spectrum; channel loss is the difference in dB between said reference signal and said measured total power;
   $\alpha$, $\beta$ and $\gamma$ are constants.

8. The equalizing combiner according to claim 7 wherein the sense of the phase shift produced in said first phase shifter (17) is determined by comparing the changes in $K(\phi)$ as a function of the phase shift produced in said second phase shifter (26) by said second local oscillator (27).

9. An equalizing combiner comprising:
   a main signal circuit including two wavepaths (80), (81);
   a main circuit output coupler (84) for combining the signals in said two wavepaths;
   characterized in that said equalizing combiner further comprises:
   an auxiliary signal circuit including two auxiliary branches (70), (71), each of which is coupled (82), (83) to one of said main circuit wavepaths (80), (81);
   an auxiliary circuit output coupler (94) for combining the signals in said auxiliary branches (70), (71) to produce an auxiliary output signal;
   first (85) and second (86) main circuit frequency converters includes in one of said wavepaths (80) for converting the signal therein from a first frequency to a second frequency and back to said first frequency;

first (88) and second (89) auxiliary circuit frequency converters includes in one of said branches (70) for converting the signal therein from said first frequency to said second frequency and back to said first frequency;

a local oscillator (87);

means for controlling said local oscillator to said first and second main circuit converters including variable phase shifter (90) for introducing a variable relative phase shift between the local oscillator signals coupled thereto;

means for coupling said local oscillator to said first and second auxiliary frequency converters including variable phase shifter (90) and a second variable phase shifter (92);

means (93) for modulating the phase shift through said second phase shifter (92);

means (95) for measuring the power in selected portions of the spectrum of the combined output signal from said auxiliary coupler (94);

means (98) for generating a control signal whose amplitude and phase is a function of the said measured powers and the phase of said modulating means (93); and means for coupling said control signal to said first variable phase shifter (90) for varying the relative phase shift between the local oscillator signal coupled to main circuit converters (85) and (86).

* * * * *

UNITED STATES PATENT AND TRADEMARK OFFICE
CERTIFICATE OF CORRECTION

PATENT NO. : 4,261,056

DATED : April 7, 1981

INVENTOR(S) : William T. Barnett-Carl W. Lundgren, Jr.-
William D. Rummler and York Y. Wang It is certified that error appears in the above—identified patent and that said Letters Patent is hereby corrected as shown below:

Column 1, line 25, "co-called" should read --so-called--.

3, line 7, equation (2) "=" second occurrence, should read --±--.

5, line 67, "hand" should read --band--.

6, line 33, "freqency" should read --frequency--.

7, line 10, "in" should read --In--;

line 57, "couler" should read --coupler--;

line 66, ";p2" should be omitted and "means" should start a new paragraph.

8, line 18, "accordng" should read --accordingly--.

Signed and Sealed this

Sixth Day of October 1981

[SEAL]

Attest:

GERALD J. MOSSINGHOFF

Attesting Officer   Commissioner of Patents and Trademarks